Patented May 8, 1923.

1,454,372

UNITED STATES PATENT OFFICE.

RUDOLF BERENDES AND FRITZ LANGE, OF ELBERFELD, GERMANY, ASSIGNORS TO FARBENFABRIKEN VORM. FRIEDR. BAYER AND CO., OF LEVERKUSSEN, NEAR COLOGNE-ON-THE-RHINE, GERMANY.

PHARMACEUTICAL PRODUCT.

No Drawing.  Application filed December 2, 1921. Serial No. 519,553.

*To all whom it may concern:*

Be it known that we, RUDOLF BERENDES and FRITZ LANGE, citizens of Germany, residing at Elberfeld, Germany, have invented new and useful Improvements in Pharmaceutical Products, of which the following is a specification.

Our invention relates to the production of a new and valuable pharmaceutical product which can be obtained by treating with tannin a yeast of any kind and origin e. g. yeast of beer or yeast obtained in distillation of spirits. Before carrying out the reaction the yeast may previously undergo plasmolysis.

Our new product when used as an internal medicine does not affect the stomach and only acts when it comes into the intestines. It is of special value when used in chronical catarrhal affections of the intestines, an average daily dose being from two to five grains. It possesses an agreeable taste.

In carrying out our invention practically we can proceed as follows, the parts being by weight:—

*Example A.*—50 parts of pressed yeast containing about 10 parts of dry material are stirred together with 25 parts of water and 8 parts of tannin for 3 to 6 hours at a temperature of 45 to 50° C. The reaction mixture is then exactly neutralized with caustic soda and filtered off. The precipitate is again washed with water and filtered off, dried, pulverized and heated for several hours to 105–120° C.

*Example B.*—50 parts of pressed yeast of beer are treated with 5 parts of common salt and the liquefied product is then stirred together with an aqueous solution of 8 parts of tannin for several hours at 40° C.

After decanting the neutralized reaction mass several times with a large quantity of water, the remaining precipitate is filtered off, dried and heated as described in Example A.

The yeast tannin compound thus obtained is a greyish powder soluble with difficulty in water, organic solvents or dilute acids, and to its greater part soluble in alkalies.

We claim:—

The herein described pharmaceutical product being chemically a compound of tannin with yeast, which is a greyish powder soluble with difficulty in water and to its greater part soluble in alkalies; and being a valuable remedy against chronical catarrhal affections of the intestines, substantially as described.

In testimony whereof we have hereunto set our hands in the presence of two subscribing witnesses.

RUDOLF BERENDES. [L. S.]
FRITZ LANGE. [L. S.]

Witnesses:
HANS BRÜCKNER,
HERMANN WEYLAND.